US007916281B2

(12) United States Patent
Haddock

(10) Patent No.: US 7,916,281 B2

(45) Date of Patent: Mar. 29, 2011

(54) APPARATUS FOR PRODUCING OPTICAL SIGNATURES FROM COINAGE

(75) Inventor: Richard M. Haddock, Redwood City, CA (US)

(73) Assignee: Coinsecure, Inc., Palo Alto, CA (US)

(*) Notice: Subject to any disclaimer, the term of this patent is extended or adjusted under 35 U.S.C. 154(b) by 0 days.

(21) Appl. No.: 12/426,861

(22) Filed: Apr. 20, 2009

(65) Prior Publication Data

US 2009/0303478 A1 Dec. 10, 2009

Related U.S. Application Data

(60) Provisional application No. 61/046,336, filed on Apr. 18, 2008.

(51) Int. Cl.
*G06K 9/74* (2006.01)

(52) U.S. Cl. .......................... 356/71; 194/302; 194/318

(58) Field of Classification Search .................... 356/71, 356/237.1–237.5, 335–343; 194/317, 328, 194/334, 303, 330, 329, 331, 335, 346; 463/17, 463/27, 16, 20, 43
See application file for complete search history.

(56) References Cited

U.S. PATENT DOCUMENTS

| | | | | |
|---|---|---|---|---|
| 4,089,400 | A * | 5/1978 | Gregory, Jr. | 194/329 |
| 4,333,557 | A * | 6/1982 | Kozak | 194/317 |
| 4,899,392 | A | 2/1990 | Merton | |
| 5,133,019 | A * | 7/1992 | Merton et al. | 382/136 |
| 5,515,960 | A * | 5/1996 | Wood | 194/328 |
| 5,694,214 | A | 12/1997 | Watanabe et al. | |
| 5,887,697 | A * | 3/1999 | Takahashi et al. | 194/317 |
| 6,328,150 | B1 | 12/2001 | Hibari | |
| 6,614,452 | B1 | 9/2003 | Cable | |
| 6,685,000 | B2 | 2/2004 | Sugata et al. | |
| 6,763,148 | B1 | 7/2004 | Sternberg et al. | |
| 6,768,983 | B1 | 7/2004 | Jakatdar et al. | |
| 7,271,918 | B2 | 9/2007 | De Groot et al. | |
| 7,307,715 | B2 | 12/2007 | Rotsch | |
| 7,324,214 | B2 | 1/2008 | De Groot et al. | |
| 2006/0008126 | A1 | 1/2006 | Holloran et al. | |
| 2006/0103855 | A1 | 5/2006 | Hazart | |
| 2007/0061772 | A1 | 3/2007 | Ye et al. | |
| 2007/0097380 | A1 | 5/2007 | De Groot et al. | |
| 2009/0284754 | A1* | 11/2009 | Haddock | 356/601 |
| 2009/0286458 | A1* | 11/2009 | Haddock | 453/63 |
| 2010/0039818 | A1* | 2/2010 | Haddock | 362/253 |

FOREIGN PATENT DOCUMENTS

| | | | |
|---|---|---|---|
| EP | 1067485 | A1 | 1/2001 |
| EP | 1023582 | B1 | 11/2003 |
| GB | 2248333 | A | 4/1992 |
| WO | 03 063053 | A1 | 7/2003 |
| WO | 2007143178 | A2 | 12/2007 |

* cited by examiner

*Primary Examiner* — Hoa Q Pham

(74) *Attorney, Agent, or Firm* — Schneck & Schneck; David M. Schneck

(57) ABSTRACT

An apparatus for producing scattering signatures from a coin comprises a platform configured to hold the coin and an electromagnetic radiation source configured to produce a beam directed toward a portion of at least one surface of the coin. The electromagnetic radiation source is arranged to produce a far-field scattering signature upon interaction the at least one surface of the coin. A plurality of collection elements is configured to produce an electrical signal based upon collecting at least a portion of the far-field scattering signature.

16 Claims, 4 Drawing Sheets

APPARATUS FOR PRODUCING OPTICAL SIGNATURES FROM COINAGE

CROSS-REFERENCE TO RELATED APPLICATION

This application claims priority from provisional application Ser. No. 61/046,336, filed Apr. 18, 2008.

TECHNICAL FIELD

The present invention relates generally to coin collecting and valuation of coins, and more particularly, to an apparatus to produce optical scattering signatures from coins to aid in valuation and prevent counterfeiting of the coins.

BACKGROUND

The interest in the collection and conservation of coins and related objects has been historically considered a personal interest activity, with little formal standards or controls concerning the trading of coins. The recent rise in the value of coins compared to earlier levels has promoted the trading of coins to a higher degree of professional structure, most significantly by the advent of commercial third party coin grading services who have developed systems to apply a widely accepted quality grade (based on a numerical scale from 1 to 70 with 70 being the highest quality). After examining and determining the grade of a coin, the commercial services place the coin in a clear plastic holder in which a grade label with a reference barcode is affixed. The clear plastic holder is then ultrasonically welded around the coin, thus permanently linking the grade to the coin within the case. A barcode is linked to the database which can be searched to confirm that the referenced coin was graded by the commercial service, along with some additional transaction details such as the date, place, person grading the coin, etc.

The grading service charges a fee for the provided services and gives a warranty of grading accuracy as part of the transaction value. The result of this commercial service is to allow the plastic encapsulated coins to be more readily traded as their trade value is directly linked to the professional quality grade on the plastic holder.

However, the current commercial grading services lack repeatability and consistency. Further, contemporary services are unable to prevent "grader shopping" in which a coin owner may specifically hunt for the highest value for a given coin since there is currently no common database or rigorous objective means for identifying a specific coin.

SUMMARY

In various exemplary embodiments, an apparatus for producing scattering signatures from a coin is disclosed. The apparatus comprises a platform configured to hold the coin and an electromagnetic radiation source configured to produce a beam directed toward a portion of at least one surface of the coin. The electromagnetic radiation source is further configured to produce a far-field scattering signature upon interaction with the at least one surface of the coin. A plurality of collection elements is configured to produce an electrical signal based upon collecting at least a portion of the far-field scattering signature.

BRIEF DESCRIPTION OF THE DRAWINGS

The appended drawing illustrates an exemplary embodiment of the present invention and must not be considered as limiting its scope.

DETAILED DESCRIPTION

Figure 1:
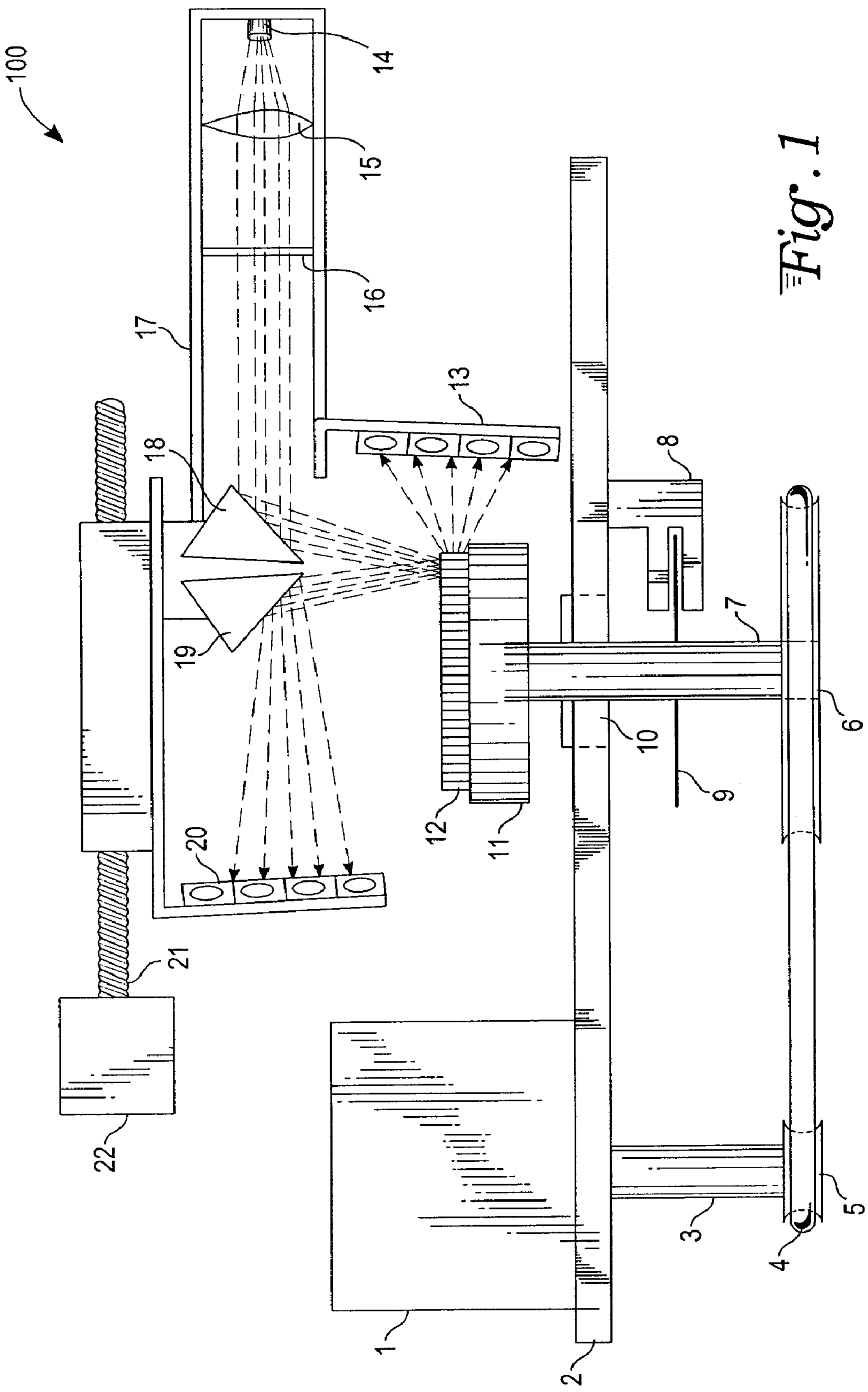
FIG. 1 is an exemplary embodiment of an apparatus to provide scattering signatures of coins in accordance with various aspects of the present invention.

In various exemplary embodiments disclosed herein, the value of the coin grading process is extended to include an ability to uniquely identify a specific coin by the detection and extraction of the coin specific features that can be reduced through the use of an algorithm to form an electronic template file representing that coin. This template file may be stored in a centralized database, for both archival storage and search and retrieval functions in the future, to determine if a given coin has already been identified within the database.

The creation of such a system solves many problems in the existing coin grading and certification business and adds value to the coin for the benefit of the coin owner. One benefit includes an ability of a party to determine if the coin has been previously seen and to review the last grade and certification reports. This can assist in minimizing grading variations in cases in which previously graded coins are broken out of the plastic holders and resubmitted for grading a second time, which is done in hopes of arbitrarily receiving a higher grade on the resubmission. It is known that this process happens today, but there is currently no means to prove a given coin is really the same one previously submitted. Having a reliable and fast means to determine if a given coin has been previously graded significantly reduces the chance of a variation in the resubmitted grading process as the reappraisal team will put in additional effort to assure an accurate result, potentially reducing warranty costs and warranty reserve requirements.

Further, a unique coin identification can reduce insurance costs by providing more absolute proof of ownership in the case of theft or loss. A permanent record of the coin ownership history can be created adding a pedigree value to the coin.

Moreover, coin owners not wanting their coins to be encapsulated in a plastic holder can have the means of having a professional grade applied to an unencapsulated coin, with a separate certificate of grade being provided, the coin and the certificate would be linked by the coin ID file to assure the right coin stays associated with the grade certificate.

What is disclosed therefore is an apparatus and method for finding and recording unique permanent features of a coin that may be converted into an electronic identification file, called a "coinprint," to allow subsequent searchers to find the specific coin again. The system comprises several components functioning together to provide an ability to analyze, capture, record, store, and retrieve a variety of physical coin characteristics that, taken together, can uniquely identify a given coin against a population of a million or more nearly identical versions of the same coin. A partial list of physical characteristics includes:

1) Surface damage of small nicks, scratches, and dings on all three coin surfaces (obverse or front side, reverse or back side, and coin edges);
2) Coin image relief height and placements;

3) Coin thickness and eccentricity;
4) Coin surface reflectivity mapped on both obverse and reverse surfaces;
5) Coin color and spectral response of both obverse and reverse surfaces;
6) Alignment and registration variations of the three surfaces in relationship to each other;
7) Variations in alloys by coin;
8) Weight of the coin; and
9) Density variations within the coin.

These characteristics can be taken singularly or in combination to develop an algorithm to represent a specific coin as a mathematical expression stored as a digital file, discussed in detail, below. The "coinprint" file is designed to allow a rapid search across a database containing a multitude of similar files to allow finding and retrieving the original file record for any subsequent presentation of the same coin to the system. The search and retrieval efficiency should be such that the look up search function can be performed in under 10 seconds when searching for 1 coin against a population of 1 million similar coins previously recorded within the database.

A final element is a simple and clear user interface to operate the system. The entire process of scanning a coin can be completed in under 30 seconds.

System Embodiment I

With reference now to FIG. 1, an exemplary embodiment of a scattering apparatus 100 for coins includes two main sections comprising a mechanical coin drive sub-system and an optical sub-system.

The mechanical coin drive sub-system includes a motor 1 for a rotary, a base plate 2, a stepper output shaft 3, an o-ring drive belt 4, a motor pulley 5, an output pulley 6, and a platform shaft 7. An optical encoder sensor 8 reads rotational positional information from an optical position encoder 9 mounted concentrically with the platform shaft 7.

A person of skill in the art will recognize the optical position encoder 9 could be mounted in other locations such as, for example, concentrically with the stepper output shaft 3 provided any slippage between the motor pulley 5 and the output pulley 6 is accounted for properly (e.g., the o-ring drive belt 4 may be replaced by a gear train thus eliminating potential belt variability or slippage). Alternatively, the motor 1 could be a stepper motor with incremental encoding or a servo motor with a rotary encoder thus potentially eliminating any need for a separate combination of optical encoder sensor 8/optical position encoder 9.

With continued reference to FIG. 1, a precision bearing 10 allows alignment of the platform shaft 7 as it passes through the base plate 2. A sample platform 11 allows placement of a sample coin 12 for optical inspection and characterization. The sample platform 11 is chosen based upon the largest coin size expected. In a specific exemplary embodiment, the sample platform 11 may be approximately 50 mm or less in diameter. The sample platform 11 may contain or be used in conjunction with a self-centering loading and indexing coin handling sub-system (not shown).

The optical sub-system includes an output PiN diode array 13 arranged to capture light scattered in the far-field from either the surface or near-surface of the sample coin 12, depending upon the type of coin being characterized. This characterization feature is described in more detail, below. The output PiN diode array 13 may be arranged to collect scattered light in, for example, a vertical or horizontal orientation. Alternatively, some other solid angle of light may be collected such as a full hemisphere of scattered light.

The output PiN diode array 13 may contain a variable sized array of only a few or several hundred photodiodes. A particular array size may be selected depending upon a level of resolution required to collect scattering signatures. The output PiN diode array 13 may also be any type of optical detector capable of converting light input into a voltage or current output. A skilled artisan will recognize that other types of light-detecting sensors may be employed either in conjunction with or as a substitute for the output PiN diode array 13. Other types of light-detecting sensors include PN photodiodes, CMOS sensor arrays, or CCD sensor arrays. Additionally, a variety of other types of either multi-segmented or arrayed sensors known in the art may readily be adapted for use in the scattering apparatus 100. Moreover, tri-color imaging sensors may be used to evaluate color and compositional elements of the sample coin 12.

The output PiN diode array 13 may also include an analyzer (not shown) placed between the sample coin 12 and the output PiN diode array 13. The analyzer allows for particular polarization states (e.g., in the form of recorded Stokes parameters) to be considered for the sample coin 12.

Depending upon the type of optical collection device chosen, collected data may be read out either serially or in parallel to be stored, displayed, or compared with other scattering signatures by, for example, a microprocessor (not shown). The microprocessor may be arranged as a part of the scattering apparatus 100 or in a stand-alone computer. Methods and techniques for storing, displaying, and comparing the data are known in the art. For example, the data may be displayed and stored as a bi-directional reflectance distribution function (BRDF) at various locations on the sample coin 12. The BRDF is defined in radiometric terms as surface irradiance divided by incident surface irradiance. The BRDF thus becomes:

$$BRDF = \frac{\text{differential radiance}}{\text{differential irradiance}} \cong \frac{\frac{\partial P_s}{\partial \Omega_s}}{P_i \cos(\theta_s)}$$

where $P_S$ is light flux scattered through a solid angle, $\Omega_S$, $P_i$ is incident power at a projected solid angle $\theta_S$ (cos ($\theta_S$) is merely a correction factor to adjust an illuminated area to an apparent size in the scattered direction).

Alternatively (or in addition to the BRDF), an auto-covariance function or a spatial power spectral density function (PSD) may be calculated from the BRDF data and used as powerful statistical tools for comparing and isolating the scattering signature from one coin from another. Also, skilled artisans are familiar with other types of scattering distribution analyses and comparisons. For example, a simple histogram plotting scattering intensity (e.g., absolute intensity or normalized by irradiance) for each sensor may be displayed and stored. In still other alternatives, a scattering plot displaying intensity as a function of sensor in an x-y or polar coordinate mapping may be used as well.

Regardless of how scattering statistics are stored, displayed, or compared, a registration mark (not shown) may be etched or otherwise marked onto the sample platform 11 to provide a starting point for displaying and comparing various scattering signatures or plots. The registration mark may simply be a small etched line or other geometric feature to produce a known scattering signature as a readily identifiable scattering feature. For example, a small (e.g., 100 μm by 100 μm) area may be etched with a square wave pattern on an outer periphery the sample platform 11 (i.e., so as not to be obscured or covered by the sample coin 12). The square wave pattern would have a highly recognizable scattering signature (e.g., a 50% duty-cycle square wave produces an odd-order Fourier scattering pattern identifiable as distinct peaks in a BRDF or PSD plot). Optionally, either any given point on the sample coin 12 (e.g., a numeral such as a "1" or a "0" from the date on the sample coin 12) may be used as a registration mark. Additionally, a point on the sample coin may be used in conjunction with the registration mark etched onto the sample platform 11.

Referring again to FIG. 1, an optical train of the optical sub-system includes a light source 14, a focusing lens 15, and an imaging slit 16. The light source 14, focusing lens 15, and imaging slit 16 are contained in an optical housing 17.

In one embodiment, the light source 14 may be a monochromatic light source such as continuous wave (CW) laser or a light emitting diode. In another embodiment, the light source may be a broadband light source with a monochromator thus allowing a series of data to be collected at a plurality of wavelengths. In still another embodiment, the light-source may contain two or more monochromatic sources. Such a setup may have two CW lasers. The lasers may be chosen to more differentiate scattering from surface or near-surface features on the sample coin 12. For example, a helium-neon laser operating at 632.8 nm and an argon-ion laser operating at 488.0 nm allow characterization of a coin at differing skin depths. Also, multiple wavelengths may be useful for characterization of ancient coins which may have an oxide or other dielectric layer. The multiple wavelengths, combined with angle-of-incidence and polarization state differences, provide scattering signatures from the top of the dielectric as well as the top of the underlying coin surface. Possibilities from any of these combinations are known to a skilled artisan.

Further, the light source 14 may include a polarizer (not shown) to adjust an output polarization state of the source. The polarizer may be used in conjunction with the analyzer optionally placed in front of the output PiN diode array 13 described above.

The focusing lens 15 and the imaging slit 16 may be arranged in a variety of ways. For example, the light source 14 may be collimated through the use of an appropriate focusing lens 15 (i.e., in the form of a collimator) and the imaging slit 16 may be a field stop to limit the field of view of the optical system and thus prevent excessive internal reflections and scattering of the light source 14. Alternatively, the light source 14 may be focused onto the sample coin 12 by the focusing lens 15. In another embodiment, the focusing lens 15 may be arranged as a lens imaging system comprised of, for example, a spherical or bi-convex lens element in series with a negative cylindrical lens. As known to a skilled artisan, such a lens imaging system provides a "line" of light that may be tuned to be diffraction limited in one axis and long enough to cover any sample coin in an orthogonal axis. Any light fall off from a midpoint of the projected line can be readily compensated for in software coupled to the collection optics, discussed below. The imaging slit 16 may be used as a horizontally-oriented slit field stop to reduce stray light from falling on the sample coin 12.

The optical housing 17 (or alternatively, simply various components contained therein) may be arranged to mechanically vary angles-of-incidence between the light source 14 and the sample coin 12. As noted herein, various angles-of-incidence may have beneficial effects when deriving various scattering signatures from, for example, different materials. The optical housing may be arranged to scatter either from the face only of the sample coin 12 or from both the face and the edge. Further, the optical housing 17 may be alternately arranged (not shown) to scatter light only from the edge of the sample coin 12. Additionally, a separate optical housing (not shown) directed toward the edge of the sample coin 12 may be used in conjunction with the optical housing 17 set-up, in this exemplary arrangement, for scattering from the face of the sample coin 12.

Referring once again to FIG. 1, the optical sub-system of the exemplary scattering apparatus 100 further includes an input mirror prism 18 and an output prism 19. The input mirror prism 18 directs the beam output from the optical train of the optical sub-system.

In an alternative embodiment (not shown), the input mirror prism 18 may be replaced by a rotating polygonal mirror. The polygonal mirror is placed in line with the output beam and rotates at a selected speed thus sweeping the input beam across the face of the sample coin 12.

In an alternative embodiment (not shown), the input mirror prism 18 may be replaced by a vibrating front-surface mirror. The front-surface mirror is placed in line with the output beam and vibrates at a selected speed thus sweeping the input beam across the face of the sample coin 12.

In another alternative embodiment (not shown), the input mirror prism 18 may be replaced by a telecentric imaging system. The telecentric imaging system provides a beam of light having substantially constant power scanned over the face of the sample coin 12.

The output prism 19 directs scattered light to a tracking PiN diode array 20. The output prism 19 and tracking PiN diode array 20 allow tracking any eccentricities within the coin such as non-circularity or other geometric irregularities. Additionally, the output prism 19 and tracking PiN diode array 20 can be used to self-calibrate for repeatability and uniformity in specimen illumination.

A tracking screw 21 controlled by a tracking stepper motor 22 (or encoded servo motor or other control means known in the art) controls movement of the beam directing and collection optics over the sample coin 12. The optical housing 17 may also be controlled by the tracking screw 21 or may be fixed. Also, the output PiN diode array 13 may be controlled by the tracking screw 21 or may be fixed in a given location.

The tracking screw 21 may be coordinated with the mechanical coin drive sub-system in various ways. In one embodiment, the tracking screw 21 may scan the sample coin 12 in an Archimedes spiral. The Archimedes spiral will scan a face of the sample coin 12 either from the center to the edge of the sample coin 12 or from the edge into the center. The spiral temporally comprises a locus of points corresponding to the locations of a point moving away from a fixed point (e.g., either the center or a starting point on the edge) with a constant speed along a line which rotates with constant angular velocity. A particular point on the coin may be correlated back to, for example, either polar coordinate locations (i.e., r-θ) or Cartesian coordinates (i.e., x-y). In another exemplary embodiment, a logarithmic spiral may be utilized in which successive turns of the spiral are increased in a geometric progression. In still other embodiments, the sample coin 12 may be held stationary while the input mirror prism 18 is moved in both x- and y-coordinate positions thus providing a raster-scan of the sample coin 12 in which the beam is scanned over the surface of the sample coin 12, stepped translationally, and then scanned again until the entire surface is covered.

Although not shown, a skilled artisan will recognize that the optical sub-assembly may have a fixed location and a translational stage added to control movement of the sample platform 11 and, hence, movement of the sample coin 12.

System Embodiment II

In another embodiment, the system allows for both generation of an electromagnetic scattering signature (e.g. optical scattering signature) from the coin and production of a digital image of the coin. These files may then be linked to each other. A coin owner would then be able to obtain either an electronic copy of both the coin and the coin's identifying signature.

Figure 2:
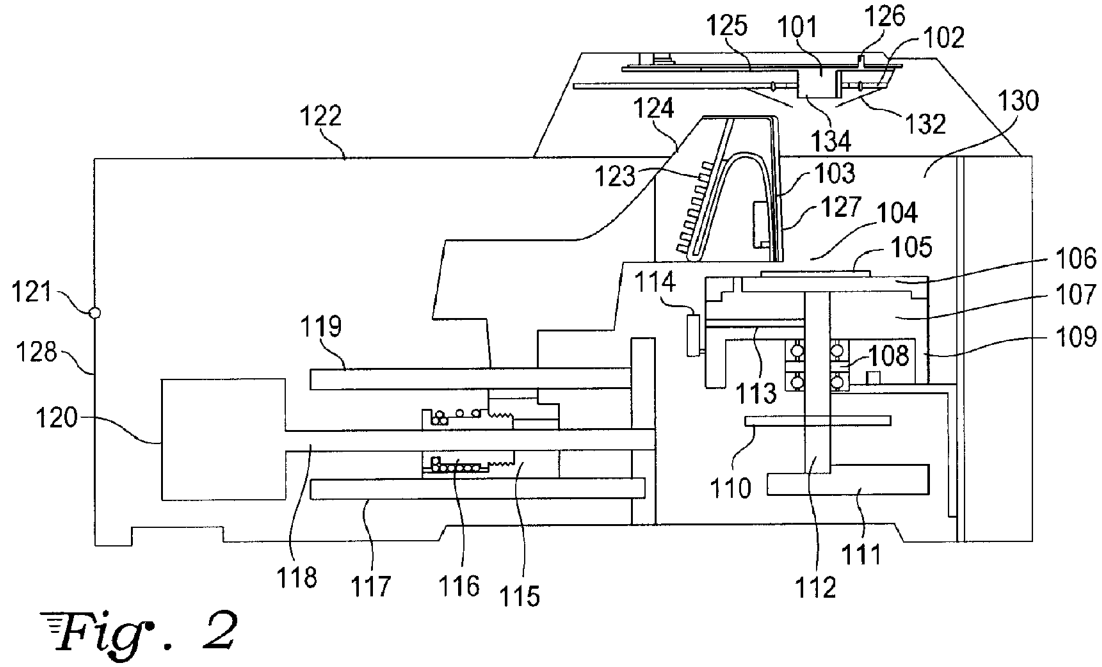
FIG. 2 is another exemplary embodiment of an apparatus to provide both scattering signatures and images of coins.

With reference to FIG. 2, such an exemplary system is shown. In this embodiment an upper cover 122 is connected to a housing by a hinge 121. Within the upper cover is a camera 101. This camera includes a lens and a imaging means, such as a CCD array. The camera lens is directed to capture an image of the coin on a stage 104 within the apparatus. Thus the interior space 130 within the apparatus provides a space between camera 101 and the coin 105. Around the camera 101 is an illumination source to provide light onto coin 105. This may be a ring of LEDs, as shown by LEDs 125 and 126 mounted on LED illumination board 102. This allows a sufficiently uniform light to be directed onto the coin. A lower group of LEDs 104 provides a second option for illumination of the coin 105. A diffusion lens 132 having a central aperture may be used with the lights to provide a more uniform lighting. A central cut out 134 provides a central hole through witch the camera lens will image the coin. In this manner light may be diffused over the coin 105 without optical interference with the camera 101.

The coin 105 may be held be a coin holder adapter 106. This coin holder adapter 106 allows the coin to be centered on a turntable 107.

The coin scattering signature from coin 105 is produced by an optical head. The optical head is mounted on sled 115. The sled is mounted on a upper sled shaft 119 and lower sled shaft 117. The sled is driven by lead screw drive driven by sled stepper motor 120. An antibacklash bearing 116 prevents backlash movement of the sled, helping ensure accurate movement.

Mounted on optical sled 115 is the optical head housing 124. Within this housing is a laser 103 that produces a laser beam. The stepper motor 120 allows precision movement of the scan head, driven by lead screw drive 118. Upper sled shaft 119 and lower sled shaft 117 ensure that the sled is moved in a precision manner. Once the sled is over a target location over the coin, the sled can be stopped and scattering detected by the photo detector array 123 within the optical head housing. Scattering of the laser light is detected as the coin is rotated, producing a scattering signature from the circumference of the coin. The photodetector array 123 in one embodiment is a set of 8 pairs of photodetecors positioned in line and at an angle within the optical head light housing 124. In one example, the detectors may be at a 20 degree angle with respect to the axis of the laser light beam produce by laser module 103.

The coin 105 is positioned on an adapter 106. Adapter 106 ensures that the coin is centered on turntable 107. Turntable 107 is mounted on turntable shaft 112. Turntable shaft is rotated by turntable stepper motor 111. A bearing assembly 108 allows rotation of the shaft by the stepper motor while assuring shaft linearity. An optical encoder 110 indexes the radial position to the captured signals from the photodetector array. The indexing of these signals allows 2500 samples to be measured for the entire circumference of a coin. For example, for a 38 mm diameter silver dollar, the scattering would be detected every 40 microns.

Figure 4:
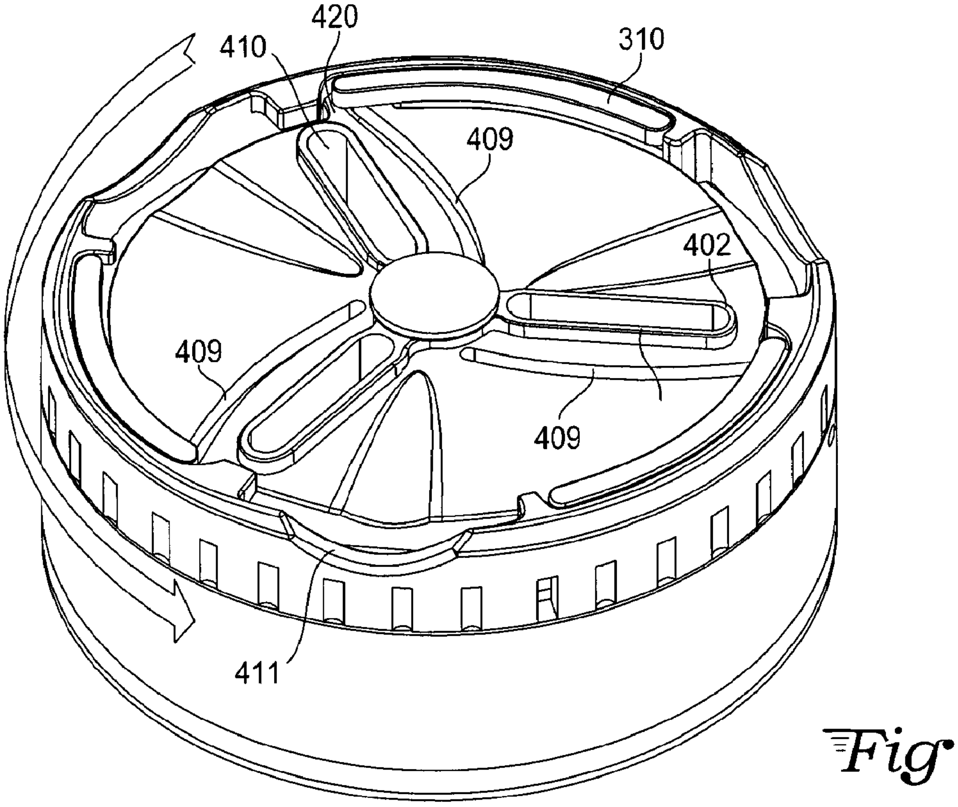
FIG. 4 is a perspective view of the turntable of FIG. 3 with the centering fingers retracted.

The edge of the coin could be detected by lightpipe 113 and optical detector 114. With reference to FIG. 4, the turntable includes a light pipe channel 410. When a coin (not shown) is placed onto the turntable, the coin will extend over the raised rims of the light pipe channel. When the laser light is directed onto the coin surface, light will not reach the light pipe until the laser has crossed the edge of the coin. As shown, three light pipe channels 410 are positioned on the turntable. If the coin is not centered the optical head can still target an edge of the coin. As the coin is rotated, the optical head is moved until light is detected in one of the light pipes. The turntable is then further rotated, and if no light is detected in the next light pipe then the coin is off center. The optical head can then continue to be moved as the coin is rotated, and the position of the edge of the coin determined by sensing when light is detected in the light pipes. The optical head can then be moved as scattering is detected to target the edge of the coin.

FIG. 4 also shows a coin centering finger 310 having a pin 420 that moves in track 409. As with the light pipe channels, three tracks allow three fingers to be mounted on the turntable. The second end of finger 310 is secured such that it pivots in place. As shown in FIG. 4, the fingers can retract to the edge of the turntable. When the turntable is rotated by rotating ring 304 while turntable base 305 remains stationary, the fingers 301 will move along tracks 409. The tips of the fingers 301 will press against the coin, centering the coin on the platform. Finger grips 311 allow placement and removal of the coin, while fluted edge 307 allow gripping of the ring to pivot the centering fingers 301 at pivot point 308. The coin rests on the raised rim 302 on the light pipe channel 410. The light pipes terminate at light pipe channel hole 306. When this light pipe aligns with a detector, as shown in FIG. 2, light in the light pipe may be detected.

The turn table includes finger grips 311 which allow for rotation of the turntable. The coin is positioned on the center coin support platform 303 and rests against the edge of raised rims of the light support.

Figure 5:
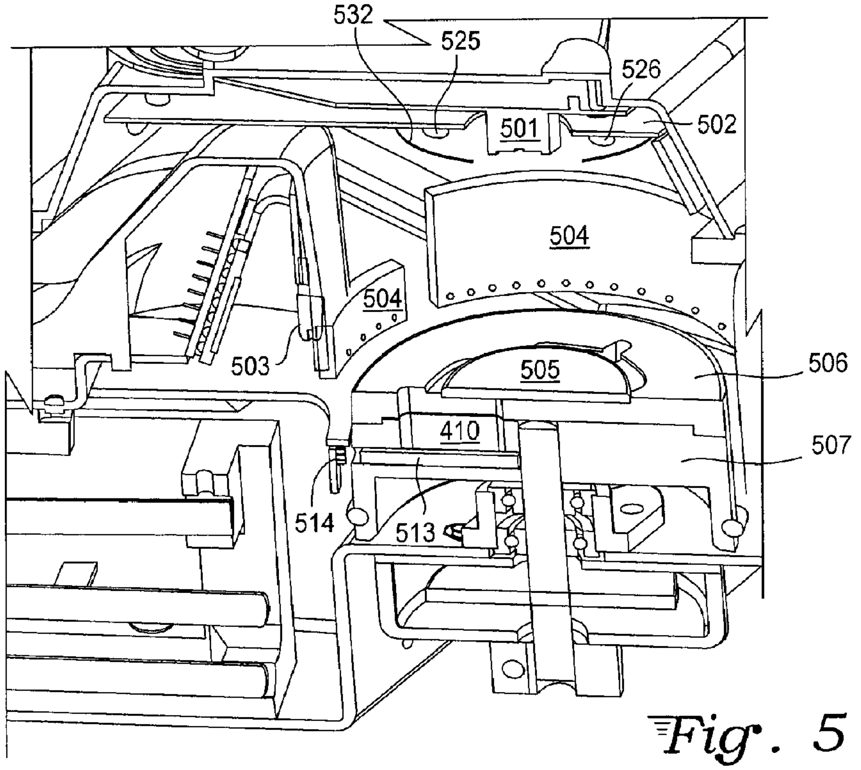
FIG. 5 is a perspective cross sectional detail of FIG. 2.
Figure 3:
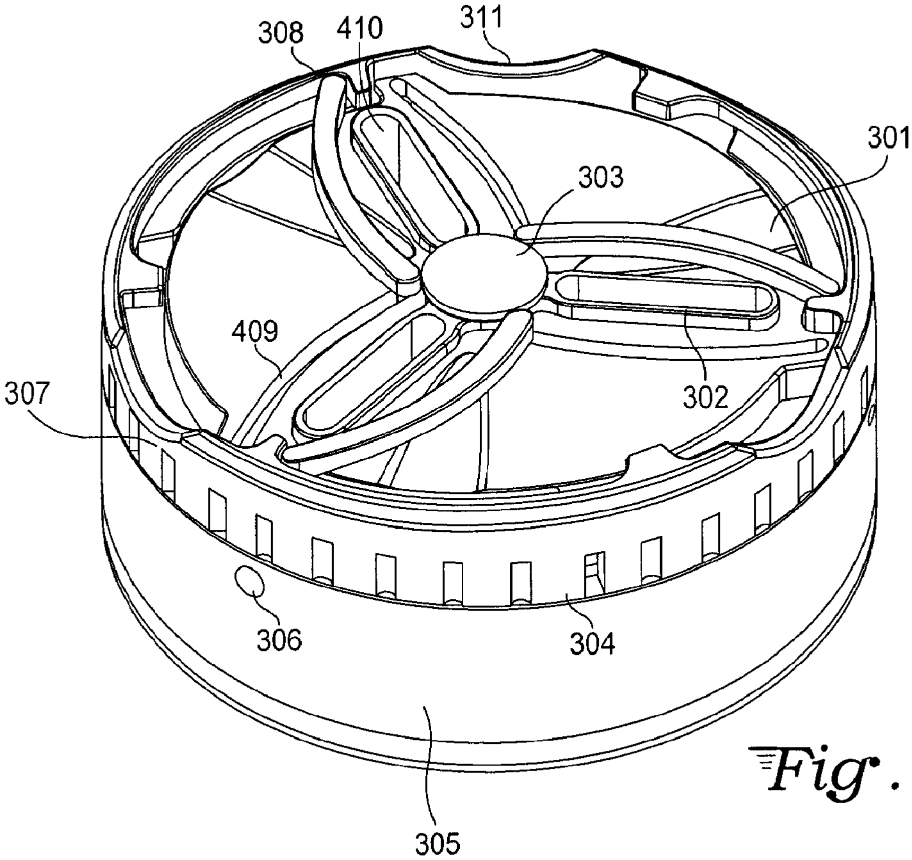
FIG. 3 is a perspective view of a coin holding turntable having a centering mechanism.

With reference to FIG. 5, the turntable 507 holds an adapter 506. If an adapter is used, the centering mechanism of FIGS. 3 and 4 would not be needed. The light pipe channel 410 extends through both the turntable 507 and the adapter 506, allowing light to pass into light pipe 513 and be detected by photo detector 514. This view also shows the bank of upper LEDs at LED illumination board 502 and the lower bank of LEDs. This lower ring is in two parts, one on the optical head light housing 524 and one on a wall encircling the coin. The sled would be positioned during imaging such that the lower LED bank had substantially equal distance from the center of the coin, when the coin is centered on the platform.

The LED bank may include a number of different colored lights, and come variation in angle of the lights. A user or automatic control could allow for optimal illumination of the coin. Some coins which are highly reflective may not photograph well using illumination from above. For example, newly minted silver coins have a highly reflective surface, making imaging of the surface features of the coin difficult. The lower bank of lights would allow for less direct light, which could be angled onto the coin, or scattered onto the coin.

Figure 6:
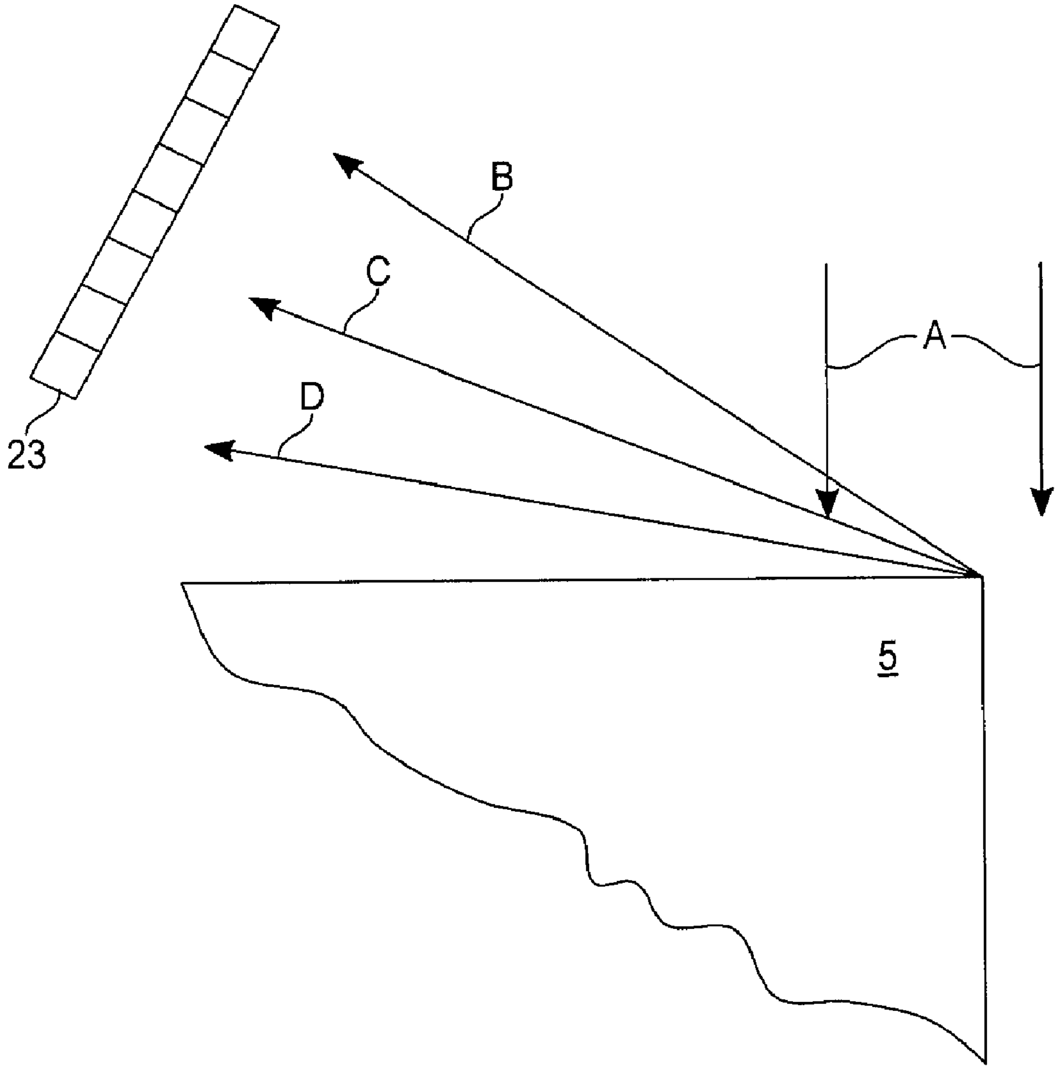
FIG. 6 is a ray diagram showing light scattering from a coin edge.

With reference to FIG. 6, the light scattering is generated by beam A, which is directed on the edge of coin 5. The beam is about 1 mm wide, and is positioned to be about half on and half off the coin. This allows for edge detection while scanning. Exemplary rays B, C, and D show light scattering from the coin. This scattered light is then detected by the photo detector array 23.

An initial step could be taking a camera image of the coin. In this process the sled is retracted away from the coin, clearing the line of sight from the camera to the coin. The turntable is turned off so that the coin is not rotated. The LED systems (e.g. lower and/or upper LEDs" are activated to illuminate the coin surface. These LED lighting may be computer controlled, allowing the illumination to be specific for each coin type for optimum image quality and for uniformity and repeatability.

Once the image is captured, the optical head is moved from the coin center to the coin edge. As the optical head is moved, the coin is rotated by the turnable 360 degrees. When the illumination source reaches the edge of the coin, the laser light will impinge onto the turntable. At regular intervals on the turntable (e.g. at 120 degrees) are channels leading to light pipes. As the coin is rotated, the light pipes regularly pass a light detector. When the laser light beam is at the edge of the coin, the laser light will begin impinging onto the turntable. As the light pipe is rotated past the light beam impinging on the turntable, some light will pass into the light pipe and be detected by the aligning photo detector. If the coin is centered on the turntable, optical head can stop moving and as the turntable rotates, the light will pass into each of the sequence of light pipes.

Once the location of the edge of the coin is known, the optical head is positioned on the edge of the coin. This circumferential area of the coin has a number of advantages, including:

1. The edge location is relatively easy and quick to find for scanning.

2. The edge tends to wear, giving the edge a distinctive scattering produced by minor damage to the edge of the coin.

3. The edge of coins commonly has features that provide a unique scattering signature.

4. The edge is a good place to repeatedly locate, as this location is defined by the angle from a face or back of the coin to a side edge of the coin.

5. By shining the beam partially on the coin and partially off the coin, the scattering signature is repeatable and small deviations in beam placement are tolerated.

The present invention is described above with reference to specific embodiments thereof. It will, however, be evident to a skilled artisan that various modifications and changes can be made thereto without departing from the broader spirit and scope of the present invention as set forth in the appended claims. For example, particular embodiments describe an electromagnetic generation device (e.g., a laser or LED) although various types of radiation sources may be employed such as deep-ultra violet (DIUV) sources, x-rays, acoustic energy (e.g., radio frequency) or a combination of source types. A skilled artisan will recognize that these various source types are flexible and the types shown herein are for exemplary purposes only. Additionally, depending upon a chosen source type or combination of types, appropriate collection optics may also be selected. For example, a DUV source cannot use traditional transmissive optics but purely reflective optics may be employed. Further, automatic focusing (AF) lens systems are known in the art and may be employed to keep an output beam focused as the beam is directed over the topography of a typical coin. The thickness and thickness variation of the coin could also be determined (e.g., as measured with reference to a height of the coin measured in reference to the platform height) by noting the current present in AF coils. These and various other embodiments are all within a scope of the present invention. The specification and drawings are, accordingly, to be regarded in an illustrative rather than a restrictive sense.

What is claimed is:

1. An apparatus for producing scattering signatures from a coin, the apparatus comprising:

a rotatable platform configured to hold the coin;

an electromagnetic radiation source configured to produce a beam directed toward a portion of at least one surface of the coin, the electromagnetic radiation source further configured to produce a scattering signature upon interaction with the at least one surface of the coin; and a plurality of collection elements configured to produce a detection signature unique to an individual coin based upon collecting at least a portion of the scattering signature over a plurality of detection events.

2. The apparatus of claim 1 wherein the electromagnetic radiation source is a laser.

3. The apparatus of claim 1 wherein the plurality of collection elements is a PiN diode array.

4. An apparatus for producing a scattering signature from a coin, comprising:

a platform configured to hold the coin;

a sled movable over an area of a coin's surface, the sled including an electromagnetic radiation source configured to direct electromagnetic radiation onto a coin surface;

a plurality of scattering detectors positioned to collect over a plurality of detection events a scattering signature unique to an individual coin from the coin surface.

5. The apparatus of claim 4, wherein said electromagnetic radiation source is a laser.

6. The apparatus of claim 5, wherein said plurality of scattering detectors is a linear array of detectors positioned obliquely with respect to an optical axis of a laser beam produced by said laser so as to receive light scattered from said coin surface.

7. The apparatus of claim 4, further including a precision stepper motor configured to move the sled.

8. The apparatus of claim 4, wherein said platform includes an edge detector.

9. The apparatus of claim 8, wherein said edge detector on said platform includes a plurality of light pipe channels on the platform and a plurality of light pipes on the platform, the light pipes and light pipe channels.

10. The apparatus of claim 8, wherein said edge detector is an optical edge detector.

11. The apparatus of claim 4, further including a camera positioned over the platform, wherein the sled may be moved away from the platform to allow said camera to image a coin on said platform.

12. The apparatus of claim 11, further including an illumination source configured to illuminate the coin during image generation by said camera.

13. The apparatus of claim 12, wherein the illumination source includes an upper bank of LEDs and a lower bank of LEDs, both the upper bank and lower bank configured to provide light onto the coin.

14. The apparatus of claim 4, further including a coin centering mechanism on said platform.

15. An apparatus for obtaining an optical scattering signature from a coin comprising:

a coin holding turntable;

an optical coin edge detector positioned to allow detection of a coin edge when said coin is on the platform;

a motor linked to said turntable such that the turntable can be rotated, a camera and camera illumination source positioned over said platform and configured to capture an image of the coin on the platform; and a sled movable over the coin, said sled including a laser and a linear array detector configured to allow detection of a scattered light from the coin and also configured to capture a unique optical coin signature.

16. The apparatus of claim 15, wherein the camber illumination source includes an upper bank of illumination sources and a lower bank of illumination sources.

* * * * *